J. C. Shaffer,

Glass Mold.

No. 87,795.                  Patented Mar. 16, 1869.

Witnesses:

Inventor:
J. C. Shaffer.

J. C. SCHAFFER, OF ROCHESTER, NEW YORK.

Letters Patent No. 87,795, dated March 16, 1869.

IMPROVED GLASS-MOULD.

The Schedule referred to in these Letters Patent and making part of the same.

*To all whom it may concern:*

Be it known that I, J. C. SCHAFFER, of the city of Rochester, in the State of New York, have invented a new and useful Glass-Mould; and I do hereby declare that the following is a full, clear, and exact description thereof, reference being had to the accompanying drawing, making part of this specification, in which—

The nature of this invention is to provide a method of attaching the bottom to a glass-mould.

By the present mode, the bottom, $a$, is attached to the mould $b$ by putting rivets through the flange $e$ and the bottom. By this means, as the mould heats, the unequal expansion of the rivets and moulds will loosen the rivets, and break them, allowing the bottom to be displaced, which will prevent the parts of the mould from registering when brought together.

My mould is made in parts, as is usual in moulds of this class.

Figure 2:
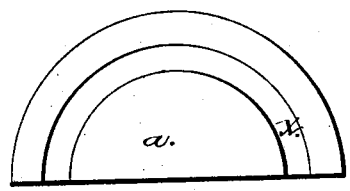
Figure 2 is an inverted view of the bottom of one-half of a glass-mould.

The bottom is attached to the mould by forming a dovetail groove, $x$, in the bottom, which is made circular, as shown in fig. 2.

Figure 1:
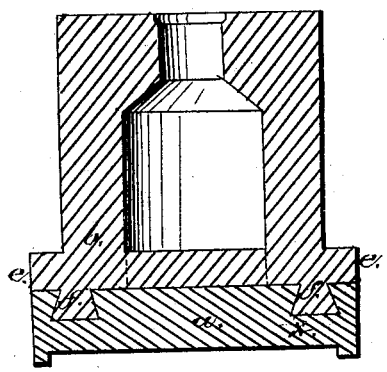
Figure 1 is a vertical elevation of the inner face of one-half of a glass-mould.

On the bottom of the mould, I form a circular dovetail tongue, $f$, fig. 1, to fit the dovetail groove $x$, in the bottom. The groove and tongue may be formed either in the mould or bottom, and may be T-shape, or in any of the known forms of dovetails.

The moulds and bottoms being in parts, all that is necessary to connect them is to enter the tongue of one part of the mould into the groove of one part of the bottom, and turn the top until the faces of both are even. This makes a solid attachment between them.

By this arrangement, the metal being the same in all the parts, there is no unequal expansion, and the bottom cannot be detached by that means, as happens in the old arrangement.

A movable dowel-pin may be put through the bottom into the mould, to keep them in position.

If at any time it is necessary to remove the bottom, to repair the mould, it is easily done by drawing out the dowel-pin, and turning the bottom around until it is separated from the mould.

The blowover, or top of a glass-mould, may be attached in the same manner, by a dovetail groove and tongue.

What I claim as my invention, and desire to secure by Letters Patent, is—

A glass-mould, having the bottom attached thereto by means of a dovetail groove and tongue, substantially as herein shown and described, and for the purpose set forth.

J. C. SCHAFFER.

Witnesses:
  JAS. LORENZO GAGE,
  R. B. WILLIS.